United States Patent
Zhu et al.

(10) Patent No.: US 10,349,326 B2
(45) Date of Patent: Jul. 9, 2019

(54) HANDOVER METHOD AND SYSTEM IN MASTER-SLAVE NETWORK, MASTER DEVICE, AND SLAVE DEVICE

(71) Applicant: Huawei Technologies Co., Ltd., Shenzhen (CN)

(72) Inventors: Chong Zhu, Wuhan (CN); Wei Ruan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/067,311

(22) PCT Filed: Dec. 31, 2015

(86) PCT No.: PCT/CN2015/100321
§ 371 (c)(1),
(2) Date: Jun. 29, 2018

(87) PCT Pub. No.: WO2017/113398
PCT Pub. Date: Jul. 6, 2017

(65) Prior Publication Data
US 2019/0007876 A1    Jan. 3, 2019

(51) Int. Cl.
*H04W 36/08*    (2009.01)
*H04W 36/18*    (2009.01)
(Continued)

(52) U.S. Cl.
CPC .......... *H04W 36/08* (2013.01); *H04W 36/18* (2013.01); *H04W 36/30* (2013.01); *H04W 36/38* (2013.01); *H04W 84/12* (2013.01)

(58) Field of Classification Search
CPC ..... H04W 36/08; H04W 36/18; H04W 36/30; H04W 36/38; H04W 84/12
(Continued)

(56) References Cited

U.S. PATENT DOCUMENTS 6,842,460 B1 * 1/2005 Olkkonen ............. H04W 48/16
                                                        370/328
9,066,269 B1 * 6/2015 Kumar ............. H04W 36/0066
(Continued)

FOREIGN PATENT DOCUMENTS

CN    101610553 A    12/2009
CN    103517264 A    1/2014
(Continued)

OTHER PUBLICATIONS

"Cisco Wireless Controller Configuration Guide," Cisco Systems, Inc, Release 7.0.98.0, XP055499975A, Jun. 2010, 960 pages.
(Continued)

*Primary Examiner* — Tan H Trinh
(74) *Attorney, Agent, or Firm* — Slater Matsil, LLP (57) ABSTRACT

A handover method in a master-slave network, and a master device, and slave devices are provided. The method includes when a master device or a first slave device determines that a user device needs to be handed over to a second slave device, the first slave device sends, to the second slave device, a first identifier of a first network interface allocated by the first slave device to the user device, and first network connection information used after the user device establishes a connection to the first network interface of the first slave device. The first identifier of the first network interface and a second identifier of the user device correspond on a one-to-one basis. The first slave device deactivates the first network interface and the second slave device activates a second network interface.

20 Claims, 7 Drawing Sheets

(51) Int. Cl.
*H04W 36/30* (2009.01)
*H04W 84/12* (2009.01)
*H04W 36/38* (2009.01)

(58) Field of Classification Search
USPC .............. 455/3.06, 437, 436, 451, 450, 442; 370/331, 329, 328, 255; 709/227
See application file for complete search history.

(56) References Cited

U.S. PATENT DOCUMENTS

| | | | |
|---|---|---|---|
| 9,351,193 B2* | 5/2016 | Raleigh | G06Q 20/40 |
| 9,497,673 B2* | 11/2016 | Blankenship | H04W 12/08 |
| 2005/0088980 A1* | 4/2005 | Olkkonen | H04W 48/16 |
| | | | 370/255 |
| 2005/0195822 A1 | 9/2005 | Lim et al. | |
| 2005/0271014 A1* | 12/2005 | Gillies | H04W 36/10 |
| | | | 370/331 |
| 2011/0281517 A1* | 11/2011 | Ukkadam | H04H 20/26 |
| | | | 455/3.06 |
| 2013/0024574 A1* | 1/2013 | Lau | H04L 65/1069 |
| | | | 709/227 |
| 2013/0051331 A1* | 2/2013 | Bao | H04W 28/24 |
| | | | 370/329 |
| 2013/0208696 A1* | 8/2013 | Garcia Martin | H04W 36/32 |
| | | | 370/331 |
| 2014/0099958 A1* | 4/2014 | Wilhelmsson | H04W 36/30 |
| | | | 455/437 |
| 2014/0341109 A1 | 11/2014 | Cartmell et al. | |
| 2015/0103804 A1 | 4/2015 | Gao et al. | |
| 2015/0215824 A1 | 7/2015 | Nigam et al. | |
| 2016/0157147 A1* | 6/2016 | Saghir | H04W 36/04 |
| | | | 455/444 |
| 2016/0205578 A1* | 7/2016 | Lee | H04W 24/10 |
| | | | 455/442 |
| 2017/0078922 A1* | 3/2017 | Raleigh | H04W 28/10 |
| 2017/0272990 A1* | 9/2017 | Mutikainen | H04W 36/04 |
| 2017/0353926 A1* | 12/2017 | Zhu | H04W 52/0216 |

FOREIGN PATENT DOCUMENTS

| | | |
|---|---|---|
| CN | 103987092 A | 8/2014 |
| CN | 104618976 A | 5/2015 |
| WO | 2015026055 A1 | 2/2015 |

OTHER PUBLICATIONS

"Handover procedure in case of bearer only served by SeNB (1A)," Agenda item: 20.2.1, Source: NSN, Nokia Corporation, Document for: TP, 3GPP TSG-RAN WG3 Meeting #82, R3-132101, San Francisco, USA, Nov. 11-15, 2013, 13 pages.

* cited by examiner

Master device

FIG. 5

Slave device

FIG. 6

HANDOVER METHOD AND SYSTEM IN MASTER-SLAVE NETWORK, MASTER DEVICE, AND SLAVE DEVICE

CROSS-REFERENCE TO RELATED APPLICATIONS

This patent application is a national phase filing under section 371 of PCT/CN2015/100321 filed Dec. 31, 2015 which is incorporated herein by reference in its entirety.

TECHNICAL FIELD

The present invention relates to the communications field, and in particular, to a handover method and system in a master-slave network, a master device, and a slave device.

BACKGROUND

With rapid development of wireless broadband technologies, radio frequency coverage of a single device no longer meets a requirement for a large area and high throughput performance. Therefore, coordination by multiple wireless devices for hybrid networking gradually becomes a trend in the industry, and a master-slave network is relatively typical.

Currently, the master-slave network includes a master device (MD), a slave device (SD), and a user device (UD). The MD controls the SD by using a management protocol, and the MD or the SD provides a network service for the UD. The UD may be handed over between multiple SDs. For example, the UD is connected to a current SD; when the UD enters a signal overlapping area of the current SD and another SD, if quality of a link between the another SD and the UD is better at this time, a handover action of the UD may be triggered, that is, the UD uses the another SD as a target SD and establishes a wireless connection to the target SD. The current SD and the target SD are two independent slave devices, and the UD needs to shake hands again with the target SD to establish a new connection. Consequently, a handover time is long.

SUMMARY

Embodiments of the present invention provide a handover method and system in a master-slave network and devices, so as to resolve a problem of a long handover time.

According to a first aspect, an embodiment of the present invention provides a handover method in a master-slave network, where the master-slave network includes a master device, a first slave device, a second slave device, and a user device, the first slave device is a current access device of the user device, and the method includes determining, by the master device or the first slave device, that the user device needs to be handed over from the access device, determining, by the master device, that the user device is to be handed over to the second slave device, and sending, by the master device to the second slave device, an identifier of a first network interface and an identifier of the user device that are received from the first slave device, where the first network interface is a network interface allocated by the first slave device to the user device when the user device accesses the first slave device, and the identifier of the user device and the identifier of the first network interface are in a one-to-one correspondence. The method further includes allocating, by the second slave device, a second network interface to the user device, where an identifier of the second network interface is the same as the identifier of the received first network interface, instructing, by the master device, the first slave device to send first network connection information to the second slave device, where the first network connection information is information used after the user device establishes a connection to the first network interface of the first slave device, and the first network connection information may include at least one of a service set identifier, an encryption mode, key information, state machine information, address resolution protocol (ARP) information, or an Internet Protocol (IP) address that is used after the user device establishes the connection to the first slave device, generating, by the second slave device, the second network connection information by using the received first network connection information, where the second network connection information is information used after the user device establishes a connection to the second network interface of the second slave device, sending, by the master device, a first handover command to the first slave device, and sending a second handover command to the second slave device, controlling, by the first slave device after receiving the first handover command, the first network interface to be deactivated, and controlling, by the second slave device after receiving the second handover command, the second network interface to be activated.

Therefore, according to the handover method in the master-slave network provided in this embodiment of the present invention, the identifier of the first network interface is uniquely allocated to the user device, and the identifier of the second network interface allocated by the second slave device is the same as the received identifier of the first network interface. After the first network interface becomes deactivated and the second network interface becomes activated, the second slave device may provide a network service for the user device by using the second network interface and the second network connection information. A process in which the user device reestablishes a connection to the slave device is omitted, and a problem of a long handover time can be resolved.

With reference to the first aspect, in a first possible implementation, before the controlling, by the first slave device after receiving the first handover command, the first network interface to be deactivated, the method further includes: discarding, by the first slave device, received data related to the user device; and sending, by the first slave device, a first instruction message after the first slave device sends all data that is to be sent to the user device, where the first instruction message is used to instruct the second slave device to start sending data to the user device, and after the controlling, by the second slave device, the second network interface to be activated, the method further includes: buffering, by the second slave device, data that is to be sent to the user device; and sending, by the second slave device to the user device after receiving the first instruction message, the data that is to be sent to the user device.

Therefore, in the first possible implementation, a loss of data that has been sent to the first slave device is fully considered. Therefore, the first slave device needs to send all the data that is to be sent, discard newly received data, and send the first instruction message to the second slave device after sending all the data that is to be sent, to instruct the second slave device to start sending data to the user device. Finally, the first slave device controls the first network interface to be deactivated. Only one slave device can provide the network service for the user device at a time. Therefore, in this case, although the second network interface of the second slave device is already activated, the second slave device needs to first buffer the data that is to be sent to the user device, and starts to send the data to the user device after receiving the first instruction message of the first slave device, that is, normally provides the network service for the user device. Therefore, in this manner, the problem of a long handover time can be resolved, and a problem of a data loss can be effectively resolved.

With reference to the first aspect or the foregoing possible implementation, in a second possible implementation, if it is the master device that determines the user device that needs to be handed over from the access device, the determining, by the master device, that the user device needs to be handed over from an access device includes: receiving, by the master device, the identifier and first link status information that are of the user device and that are sent by the first slave device; and determining, by the master device according to the first link status information and a first handover condition, that the user device needs to be handed over from the access device, where the first handover condition is that at least one value in the first link status information reaches a corresponding preset threshold.

With reference to the first aspect or the foregoing possible implementations, in a third possible implementation, if it is the first slave device that determines the user device that needs to be handed over from the access device, the determining, by the first slave device, that the user device needs to be handed over from an access device includes determining, by the first slave device according to first link status information of the user device and a first handover condition, that the user device needs to be handed over from the access device, and sending a second indication message to the master device, where the second indication message is used to notify the master device that the user device needs to be handed over from the access device, the second indication message carries the identifier of the user device, and the first handover condition is that at least one value in the first link status information reaches a corresponding preset threshold.

The first link status information includes at least one of a received signal strength indicator RSSI related to the user device, a packet error rate PER related to the user device, a signal-to-noise ratio related to the user device, a quantity of user devices that access the first slave device, a duty cycle of a user device that accesses the first slave device, or a throughput of a user device that accesses the first slave device.

With reference to the first aspect or the foregoing possible implementations, in a fourth possible implementation, the determining, by the master device, that the user device is to be handed over to the second slave device includes: receiving, by the master device, the identifier and an operating channel that are of the user device and that are sent by the first slave device; sending, by the master device, the identifier and the operating channel that are of the user device to the second slave device; sending, by the second slave device, second link status information to the master device, where the second link status information includes at least one of an RSSI that is related to the user device and that is on the operating channel obtained by the second slave device, a packet error rate PER that is related to the user device and that is on the operating channel obtained by the second slave device, a signal-to-noise ratio that is related to the user device and that is on the operating channel obtained by the second slave device, a quantity of user devices that access the second slave device, a duty cycle of a user device that accesses the second slave device, or a throughput of a user device that accesses the second slave device; and determining, by the master device according to the second link status information and a second handover condition, that the user device is to be handed over to the second slave device, where the second handover condition is that at least one value in the second link status information reaches a corresponding preset threshold.

With reference to the first aspect or the foregoing possible implementations, in a fifth possible implementation, the instructing, by the master device, the first slave device to send first network connection information to the second slave device includes: obtaining, by the master device, the first network connection information, and sending the first network connection information to the second slave device; or sending, by the master device, a third instruction message to the first slave device, where the third instruction message is used to instruct the first slave device to send the first network connection information to the second slave device.

According to a second aspect, an embodiment of the present invention provides a master device, where the master device is configured to implement a function of the method performed by the master device in the first aspect, and is implemented by using hardware/software, and the hardware/software thereof includes a unit corresponding to the foregoing function.

According to a third aspect, an embodiment of the present invention provides a slave device, where the slave device is configured to implement a function of the method performed by the first slave device in the first aspect, and is implemented by using hardware/software, and the hardware/software thereof includes a unit corresponding to the foregoing function.

According to a fourth aspect, an embodiment of the present invention provides a slave device, where the slave device is configured to implement a function of the method performed by the second slave device in the first aspect, and is implemented by using hardware/software, and the hardware/software thereof includes a unit corresponding to the foregoing function.

According to a fifth aspect, an embodiment of the present invention provides a master device, including a processor, a network interface, a memory, and a communications bus, where the communications bus is configured to implement connection and communication between the processor, the network interface, and the memory, and the processor executes a program stored in the memory to implement steps in the method of the master device provided in the first aspect.

According to a sixth aspect, an embodiment of the present invention provides a slave device, including a processor, a network interface, a memory, and a communications bus, where the communications bus is configured to implement connection and communication between the processor, the network interface, and the memory, and the processor executes a program stored in the memory to implement steps of the first slave device provided in the first aspect.

According to a seventh aspect, an embodiment of the present invention provides a slave device, including a processor, a network interface, a memory, and a communications bus, where the communications bus is configured to implement connection and communication between the processor, the network interface, and the memory, and the processor executes a program stored in the memory to implement steps of the second slave device provided in the first aspect.

According to an eighth aspect, an embodiment of the present invention provides a network system, where the system includes the master device, the first slave device, the second slave device, and the user device according to the foregoing aspects.

According to a ninth aspect, an embodiment of the present invention provides a computer storage medium that is configured to store a computer software instruction used by the foregoing master device, and the computer storage medium includes a program designed for executing the foregoing aspects.

According to an eighth aspect, an embodiment of the present invention provides a computer storage medium that is configured to store a computer software instruction used by the foregoing master device, the first slave device, and the second slave device, and the computer storage medium includes a program designed for executing the foregoing aspects.

In the foregoing aspects and possible implementations, the first network connection information includes at least one of a service set identifier, an encryption mode, key information, state machine information, address resolution protocol ARP information, the identifier of the user device, or an Internet Protocol IP address.

Compared with the prior art, according to the solutions provided in the present invention, a process in which the user device reestablishes a connection to the slave device can be omitted, and a problem of a long handover time can be resolved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
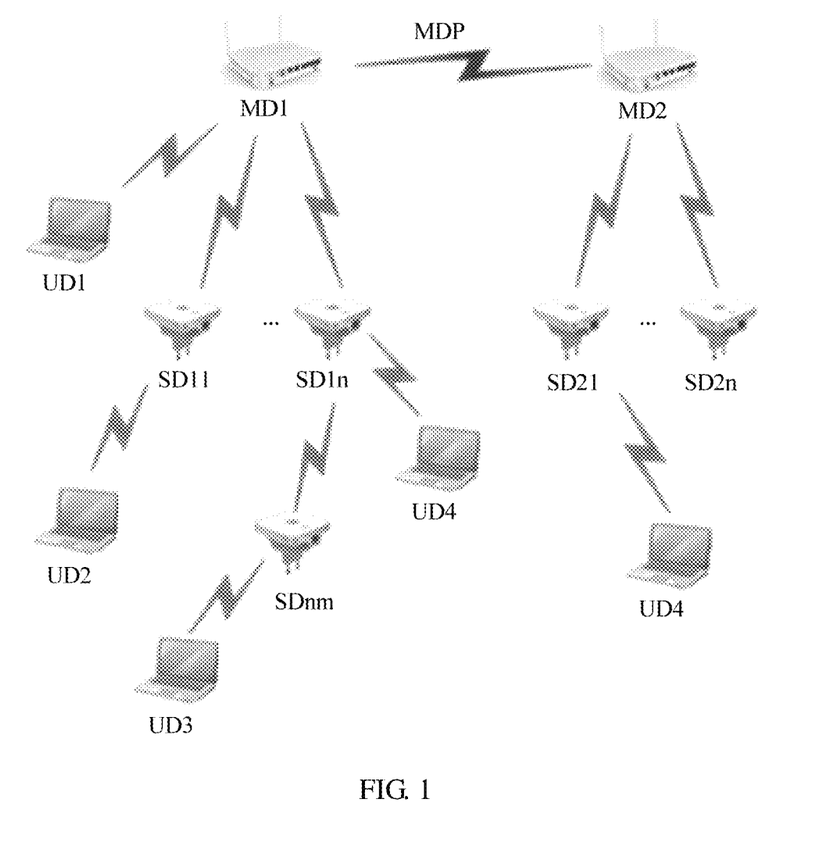
FIG. 1 is a schematic structural diagram of master-slave networking according to an embodiment of the present invention.

An embodiment of the present invention may be applicable to master-slave networking. As shown in FIG. 1, the master-slave networking includes multiple master devices, such as an MD1 and an MD2, each master device may be connected to multiple slave devices, such as an SD11 and an SD1$n$, and each SD may be connected to multiple UDs, such as a UD1, a UD2, and a UD3.

Specifically, one master device and multiple slave devices may form a communications network, and the master device is responsible for managing the communications network. Only one master device exists in a communications network, and master devices in different communications networks may complete communication interaction based on a master device communication protocol (MDCP). The master device may directly provide a network service for a user device. When a slave device directly provides a network service for the user device, the master device cooperates with the slave device to provide the network service for the user device. The master device or the slave device that directly provides the network service for the user device may be collectively referred to as an access device. When an access device that directly provides a network service for the user device is no longer appropriate to provide the network service for the user device, a handover from the access device is triggered, that is, another access device that provides a network service for the user device is selected.

It should be noted that the master device and the slave device are merely functionally classified. Actually, a hardware device may be used as a master device, or may be used as a slave device, or may be used as a master device and a slave device at the same time. The user device may be a terminal equipped with a wireless communications module, such as a PC, a tablet, or a mobile phone, and the wireless communications module includes Wi-Fi, Bluetooth, Zigbee, or the like.

For example, AC-based Wi-Fi centralized control networking belongs to the foregoing master-slave networking, and includes an access point controller (AC) serving as a master device, an access point (AP) serving as a slave device, and a user device (UD), and the user device may be handed over between multiple APs.

This embodiment of the present invention may be applied to any master-slave wireless communications system. A Wi-Fi field is used as an example below to describe this embodiment of the present invention in detail.

Figure 2:
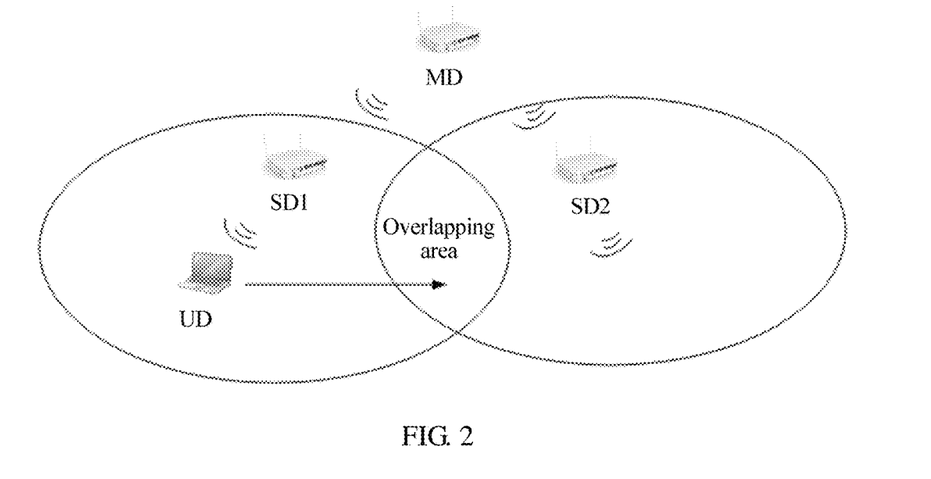
FIG. 2 is a schematic diagram of a master-slave networking handover scenario according to an embodiment of the present invention.

FIG. 2 is a schematic diagram of a typical handover scenario according to an embodiment of the present invention. As shown in FIG. 2, the master-slave networking includes an MD, an SD1, an SD2, and a UD. The UD is connected to the SD1, and the UD moves rightward along an arrow direction. When the UD enters a signal overlapping area of the SD1 and the SD2, if quality of a link between the SD2 and the UD is better at this time, a handover action from an access device of the UD is triggered. For ease of understanding, a communications network is used as an example to describe the handover method in this embodiment of the present invention. That is, one master device, two slave devices (a first slave device and a second slave device), and one user device are used as an example to describe how the user device completes a handover between the two slave devices. The master device may also have a service function of the slave device. Therefore, the master device and the first slave device may be a same device, or the master device and the second slave device may be a same device. An actual networking structure is more complex than this networking structure. For the actual networking structure, refer to FIG. 1.

Figure 3A:
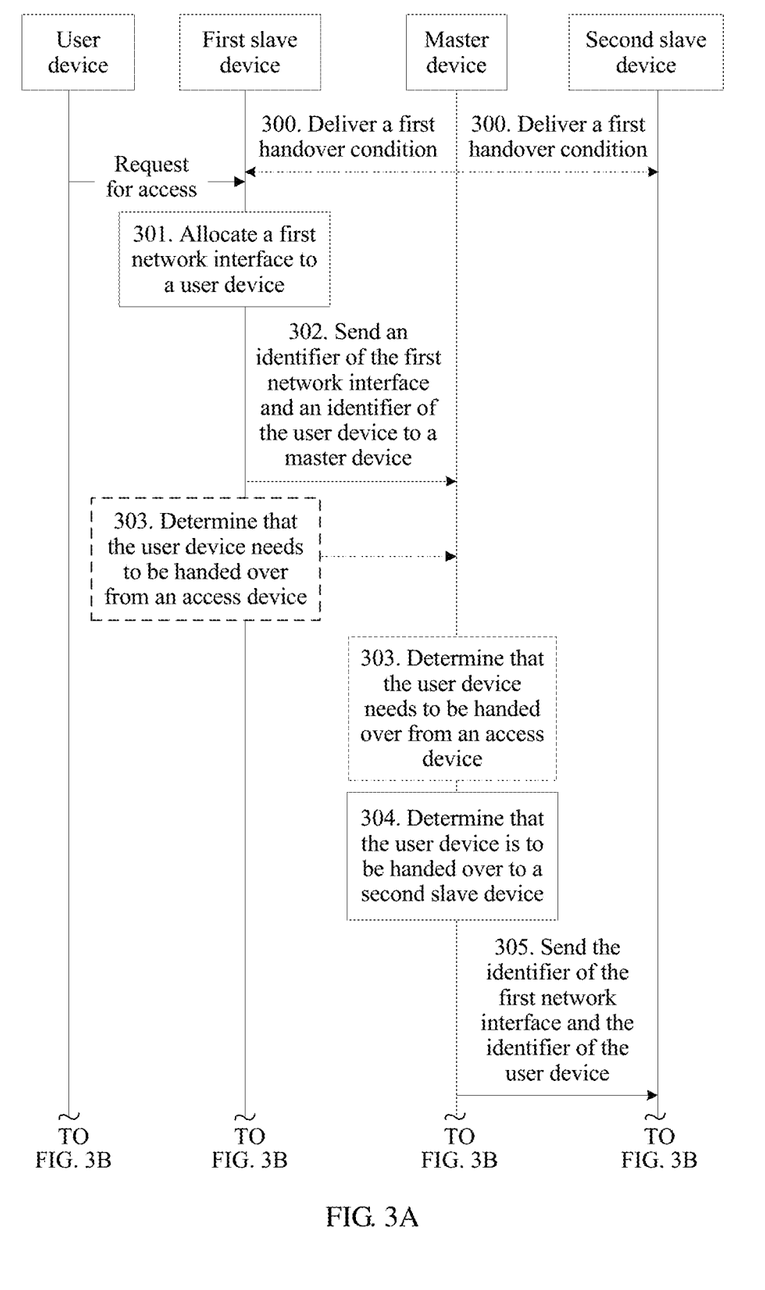
FIG. 3A and FIG. 3B are a flowchart of a handover method in a wireless network according to an embodiment of the present invention.

300 (Optionally). The master device delivers a first handover condition to the first slave device and the second slave device.

The first handover condition is used to determine whether the user device needs to be handed over from the access device. Specifically, when a value of first link status information meets the first handover condition, it is determined that the user device needs to be handed over from the access device. When the value of the first link status information does not meet the first handover condition, it is determined that the user device does not need to be handed over from the access device. The first link status information may include at least one of a received signal strength indicator (RSSI) related to the user device, a packet error rate (PER) related to the user device, a signal-to-noise ratio related to the user device, a quantity of user devices that access the first slave device, a duty cycle of a user device that accesses the first slave device, or a throughput of a user device that accesses the first slave device. The first handover condition may be that at least one value in the first link status information reaches a corresponding preset threshold. The first handover condition may further be that a weighted value of some first link status information or all first link status information that is in the first link status information and whose value reaches a corresponding preset threshold reaches a weighted value preset threshold. How to specifically set the first handover condition is not specifically limited in this embodiment of the present invention.

It should be noted that "reaching" the corresponding preset threshold includes being greater than or equal to the corresponding preset threshold, being less than or equal to the corresponding preset threshold, or the like. A specific meaning needs to be limited according to an actual parameter, because for some parameters, a smaller value may indicate poorer link quality, and on the contrary, for some parameters, a larger value may indicate poorer link quality, and further, it is possible that when a value of a parameter is equal to a preset enumerated value, the corresponding preset threshold is reached. For example, that a value of the RSSI is less than or equal to a preset threshold of the RSSI is defined as meeting the first handover condition. In this case, it is determined that the user device needs to be handed over from the access device. Alternatively, that a value of the RSSI is less than or equal to a preset threshold of the RSSI and a value of the PER is greater than or equal to a preset threshold of the PER is defined as meeting the first handover condition. In this case, it is determined that the user device needs to be handed over from the access device. Specifically, which parameter is used and how to set a preset threshold of the parameter may be set according to an actual product design requirement, and this is not specifically limited in this embodiment of the present invention, provided that the user device that needs to be handed over from the access device can be collaboratively identified.

It should be noted that the first handover condition may be configured in the master device and the slave device at an initial networking stage, or may be pre-stored before the master device and the slave device are delivered from a factory.

301. The first slave device allocates a first network interface to the user device when the user device requests to access the first slave device.

It should be noted that the first network interface may be a network interface existing on the first slave device, or may be a newly established network interface on the first slave device.

302. The first slave device sends an identifier of the allocated first network interface and an identifier of the user device to the master device, where the identifier of the first network interface and the identifier of the user device are in a one-to-one correspondence.

It should be noted that the identifier of the first network interface may be an idle identifier in a set of network interface identifiers allocated by the master device to the slave device, and at least one network interface identifier is allocated to each slave device. The network interface identifier may be a basic service set identifier (BSSID) in a Wi-Fi environment, or may be another identifier that is used to distinguish a network device. This is not limited in this application.

The set of network interface identifiers allocated to each slave device is not duplicated. When the user device needs to access the first slave device, the first slave device allocates a network interface to the user device, and allocates the identifier to the first network interface. Once the identifier is allocated to the user device, the identifier cannot be allocated to another user device that requests to access the first slave device, that is, the identifier of the first network interface and the identifier of the user device are in a one-to-one correspondence. In this way, it can be ensured that the network interface identifier allocated by the slave device to each user device is unique network-wide, and a case in which different user devices are corresponding to a same network interface identifier does not occur. Alternatively, each slave device stores a set of network interface identifiers. After a slave device selects an idle identifier and allocates the idle identifier to a user device, the slave device notifies another slave device that the identifier is already occupied, and the another slave device updates the stored set of network interface identifiers. In this way, it can also be ensured that the network interface identifier allocated by the slave device to the user device is unique network-wide.

The first slave device sends the identifier of the first network interface allocated to the user device and the identifier of the user device to the master device. The master device stores the identifier of the first network interface and the identifier of the user device. For example, the identifier of the first network interface and the identifier of the user device are stored in a manner of a correspondence table, or may be stored in another manner. This is not limited in this embodiment of the present invention.

The identifier of the user device may be a Media Access Control (Media Access Control, MAC) address of the user device. The first network interface may be a logical virtual interface allocated by the first slave device to the user device, and the identifier of the first network interface is usually a MAC address of the logical virtual interface.

303. The master device or the first slave device determines that the user device connected to the first slave device needs to be handed over from the access device.

How the master device determines whether the user device connected to the first slave device needs to be handed over from the access device is described in detail below.

An implementation in which the master device determines the user device that needs to be handed over from the access device may be: The first slave device sends the identifier and the first link status information of the user device, and the master device determines, according to the first link status information and the first handover condition, that the user device needs to be handed over from the access device.

Optionally, the first slave device may periodically send, to the master device, the identifier and the first link status information of the user device connected to the first slave device, and the master device determines, according to the received first link status information and the first handover condition, the user device that needs to be handed over from the access device. In this way, the master device can perform link status optimization according to a status of network-wide slave devices. Herein, the first slave device may actively send the identifier and the first link status information of the user device to the master device, or the master device may actively obtain the identifier and the first link status information of the user device from the first slave device. This is not limited in this application.

It should be noted that the first handover condition is that at least one value in the first link status information reaches a corresponding preset threshold.

Optionally, the first slave device may first determine, according to the first link status information of the user device connected to the first slave device and a to-be-handed-over condition preset in the first slave device, a user device that may need a handover. For example, the first slave device may periodically obtain the first link status information of the user device connected to the first slave device. If there is a user device whose first link status information meets the to-be-handed-over condition, the first slave device sends the identifier and the first link status information of the user device to the master device, so that the master device determines, from a received user device according to the received first link status information and the first handover condition, a user device that needs to be handed over from an access device. In this way, the first slave device sends identifiers and first link status information of only some user devices to the master device and does not need to send, to the master device, identifiers and first link status information of all user devices connected to the first slave device, and a bandwidth resource can be effectively saved. Herein, the master device may actively and periodically obtain first link status information that is of a user device whose first link status information meets the to-be-handed-over condition and that is determined by the first slave device, or the first slave device may actively and periodically obtain first link status information that is of a user device and that meets the to-be-handed-over condition and send the first link status information to the master device. This is not limited in this application.

How the first slave device determines that the user device connected to the first slave device needs to be handed over from the access device is described in detail below.

An implementation in which the first slave device determines that the user device needs to be handed over from the access device may be: The first slave device determines, according to the first link status information of the user device and the first handover condition, that the user device needs to be handed over from the access device, and sends a second indication message to the master device. The second indication message is used to notify the master device that the user device needs to be handed over from the access device, and the second indication message carries the identifier of the user device.

The first slave device may obtain the first link status information of the user device in real time, determine, according to the first link status information and the first handover condition, the user device that needs to be handed over from the access device, and send the second indication message to the master device to notify the master device that the user device needs to be handed over from the access device. That is, the first slave device determines the user device that needs to be handed over from the access device and notifies the master device, and the master device does not need to determine the user device that needs to be handed over from the access device. In this way, when a link condition of the user device is poor, the first slave device may determine by itself whether the user device needs to be handed over from the access device. This can quickly complete a handover from the access device, reduce load of the master device, and effectively save a bandwidth resource.

304. The master device determines whether the user device is to be handed over to the second slave device.

Specifically, the master device may send the identifier and an operating channel that are of the user device to the second slave device, and the second slave device sends second link status information to the master device. The second link status information includes at least one of an RSSI that is related to the user device and that is on the operating channel obtained by the second slave device, a packet error rate PER that is related to the user device and that is on the operating channel obtained by the second slave device, a signal-to-noise ratio that is related to the user device and that is on the operating channel obtained by the second slave device, a quantity of user devices that access the second slave device, a duty cycle of a user device that accesses the second slave device, or a throughput of a user device that accesses the second slave device. The master device determines, according to the second link status information and a second handover condition, whether the user device needs to be handed over to the second slave device. Specifically, the master device may determine, according to one or more values in the second link status information and a corresponding preset threshold in the second handover condition, whether the user device needs to be handed over to the second slave device. Alternatively, the master device may perform weighted calculation on all values in the second link status information, and determine, according to an obtained weighted value and a preset threshold of the weighted value, whether the user device needs to be handed over to the second slave device. This is not limited in this application. For example, if the RSSI that is of the user device and that is on the operating channel obtained by the second slave device is greater than or equal to a corresponding preset threshold, the master device determines that the user device needs to be handed over to the second slave device. For another example, if the RSSI that is of the user device and that is on the obtained operating channel is greater than or equal to a corresponding preset threshold, and the quantity of the user devices that access the second slave device is less than a corresponding preset threshold, the master device determines that the user device needs to be handed over to the second slave device.

If a network includes at least three slave devices, after a user device that needs to be handed over from an access device is determined, the master device further determines a target slave device to which the user device is to be handed over. The master device sends, to other slave devices than the first slave device, an identifier and an operating channel that are of the user device that needs to be handed over from the access device. The slave devices that receive the identifier and the operating channel that are of the user device performs an operation performed by the second slave device above, and the master device determines, according to the notification message, the target slave device to which the user device is to be handed over.

It should be noted that if there are multiple slave devices that reach a corresponding preset threshold, one slave device may be selected from the multiple slave devices as the target slave device, for example, an optimal slave device may be selected or a slave device may be randomly selected.

It should further be noted that in this application, a parameter used in the three handover conditions, that is, the first handover condition, the second handover condition, and the to-be-handed-over condition, is a parameter in link status information. A difference is that a preset threshold corresponding to each parameter is different. If a description is made according to a sequence of link quality, link quality when the second handover condition is met is better than link quality when the to-be-handed-over condition is met, and the link quality when the to-be-handed-over condition is met is better than link quality when the first handover condition is met. That is, when the first slave device detects that the RSSI related to the user device is less than R1 (the to-be-handed-over condition), it indicates that a current network status is about to become poor, but the first slave device can still keep providing a network service for the user device. However, the first slave device needs to notify the master device that the user device may be handed over from the access device at a future moment, and the master device periodically obtains the RSSI related to the user device. When the RSSI related to the user device is less than R2 (the first handover condition), it indicates that the current network status is poor, and a handover from the access device of the user device needs to be immediately started; otherwise, a packet loss case or the like occurs. When the handover from the access device of the user device is started, the other slave devices need to monitor the RSSI of the user device, and a slave device whose RSSI is greater than R3 (the second handover condition) needs to be selected as the target slave device, where R3 is greater than R1, and R1 is greater than R2.

305. The master device sends the identifier of the first network interface and the identifier of the user device to the second slave device.

After determining that the user device is to be handed over to the second slave device, the master device sends, to the second slave device, the identifier of the first network interface allocated by the first slave device to the user device and the identifier of the user device.

306. The second slave device allocates a second network interface to the user device, where an identifier of the second network interface is the same as the received identifier of the first network interface.

Specifically, after receiving the identifier of the first network interface and the identifier of the user device, the second slave device may allocate a network interface to the user device, and an identifier of the network interface is the same as the identifier of the first network interface.

It should be noted that the second network interface may be a network interface existing on the second slave device, or may be a newly established network interface on the second slave device.

Figure 3B:
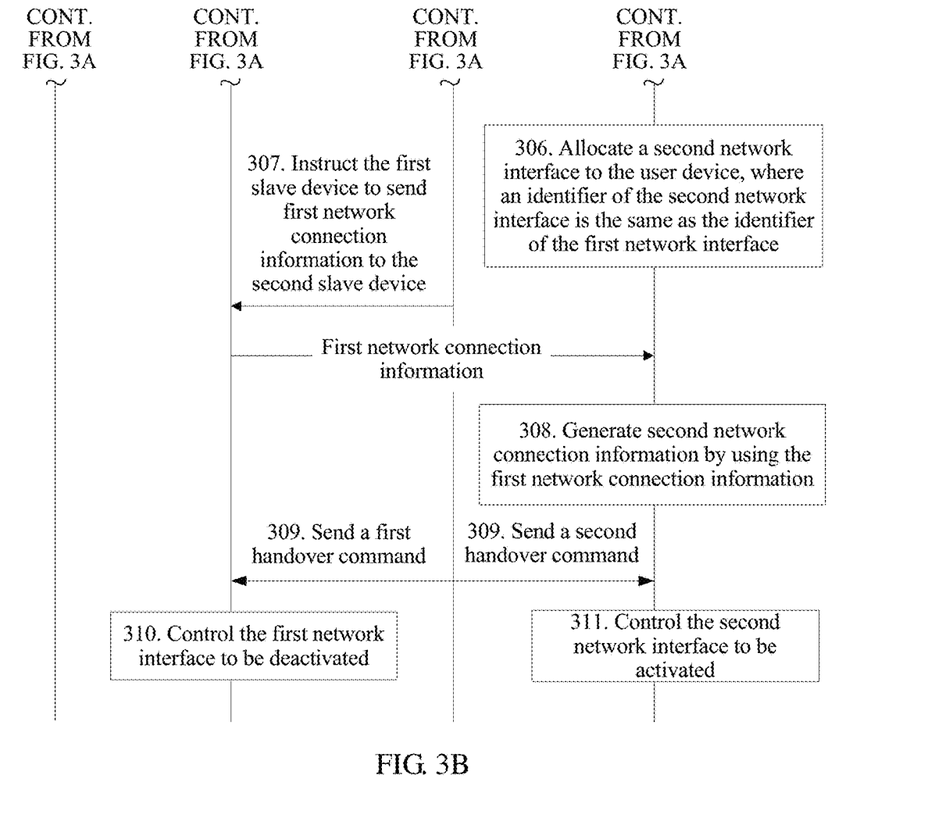

307. The master device instructs the first slave device to send first network connection information to the second slave device, where the first network connection information is network connection information used after the user device establishes a connection to the first network interface of the first slave device.

The first network connection information may include at least one of a service set identifier (such as a service set identifier (SSID) in a Wi-Fi environment), an encryption mode, key information, state machine information, ARP information, the identifier of the user device, or an IP address that is used after the user device establishes the connection to the first slave device.

Specifically, the master device may actively obtain the first network connection information from the first slave device, and send the first network connection information to the second slave device.

Alternatively, the master device sends a third instruction message to the first slave device, where the third instruction message is used to instruct the first slave device to send the first network connection information to the second slave device. After receiving the third instruction message, the first slave device may send the first network connection information to the master device, and then the master device sends the first network connection information to the second slave device, that is, the first slave device sends the first network connection information to the second slave device by using the master device. Certainly, the first slave device may directly send the first network connection information to the second slave device.

A user device in a Wi-Fi environment is used as an example for description. When the user device needs to access an AP, the user device first needs to search for a network in an area in which the user device is located. When an AP to which a connection needs to established is determined, the user device needs to perform authentication, association, a four-way handshake (4-way Handshake), and a group handshake (Group Handshake) with the found AP, and the user device further needs to exchange ARP information and IP address information with the AP.

For example, after the user device successfully establishes a connection to the first slave device, network connection information on the first slave device is as follows:
Encryption mode: WPA2-PSK CCMP
Identifier of the user device: 1c:8e:5c:cf:e4:49
Key information: oxa15735ab1a1b1cacbbccaa8a796474ao
State machine information: connected
ARP information: 192.168.3.27 1c:8e:5c:cf:e4:49
IP address: 192.168.3.27
Service set identifier: SSID-e449

The first slave device needs to send the foregoing network connection information to the second slave device. The network connection information may be directly sent to the second slave device, or may be sent to the second slave device after encryption. This is not limited in this embodiment of the present invention.

308. The second slave device generates second network connection information by using the received first network connection information, where the second network connection information is information used after the user device establishes a connection to the second network interface of the second slave device.

For example, the second network connection information generated by the second slave device by using the first network connection information is as follows:
Encryption mode: WPA2-PSK CCMP
Identifier of the user device: 1c:8e:5c:cf:e4:49
Key information: oxa15735ab1a1b1cacbbccaa8a796474ao
State machine information: connected
ARP information: 192.168.3.27 1c:8e:5c:cf:e4:49
IP address: 192.168.3.27
Service set identifier: SSID-e449

The second slave device directly generates the second network connection information of the second slave device by using the first network connection information of the user device and the first slave device, so that a process of performing multiple handshakes with the user device is omitted, and a network handover is quickly completed.

309. The master device sends a first handover command to the first slave device, and sends a second handover command to the second slave device.

It should be noted that the master device may simultaneously send the first handover command to the first slave device and send the second handover command to the second slave device, or may first send the second handover command to the second slave device and then send the first handover command to the first slave device.

The first handover command may be actively delivered by the master device to the first slave device after the master device instructs the first slave device to send the first network connection information to the second slave device, or may be delivered by the master device to the first slave device after the first slave device sends the first network connection information to the second slave device and then feeds back response information to the master device and after the master device receives the response information. In this case, the first network connection information has been sent when the first slave device receives the first handover command.

The second handover command may be actively delivered by the master device to the second slave device after the master device instructs the first slave device to send the first network connection information to the second slave device, or may be delivered by the master device to the second slave device after the second slave device receives the first network connection information and then feeds back response information to the master device and after the master device receives the response information. In this case, the first network connection information has been received when the second slave device receives the second handover command.

The first handover command is used to trigger the first slave device to control the first network interface to be deactivated. For example, a status of the first network interface may be set to down. The second handover command is used to trigger the second slave device to control the second network interface to be activated. For example, a status of the second network interface may be set to up.

310. The first slave device controls, after receiving the first handover command, the first network interface to be deactivated.

311. The second slave device controls, after receiving the second handover command, the second network interface to be activated.

Therefore, according to the handover method in the master-slave network provided in this embodiment of the present invention, the identifier of the first network interface is uniquely allocated to the user device, and the identifier of the second network interface allocated by the second slave device is the same as the received identifier of the first network interface. After the first network interface becomes deactivated and the second network interface becomes activated, the second slave device may provide a network service for the user device by using the second network interface and the second network connection information. A process in which the user device reestablishes a connection to the slave device is omitted, and a problem of a long handover time can be resolved.

Figure 4A:
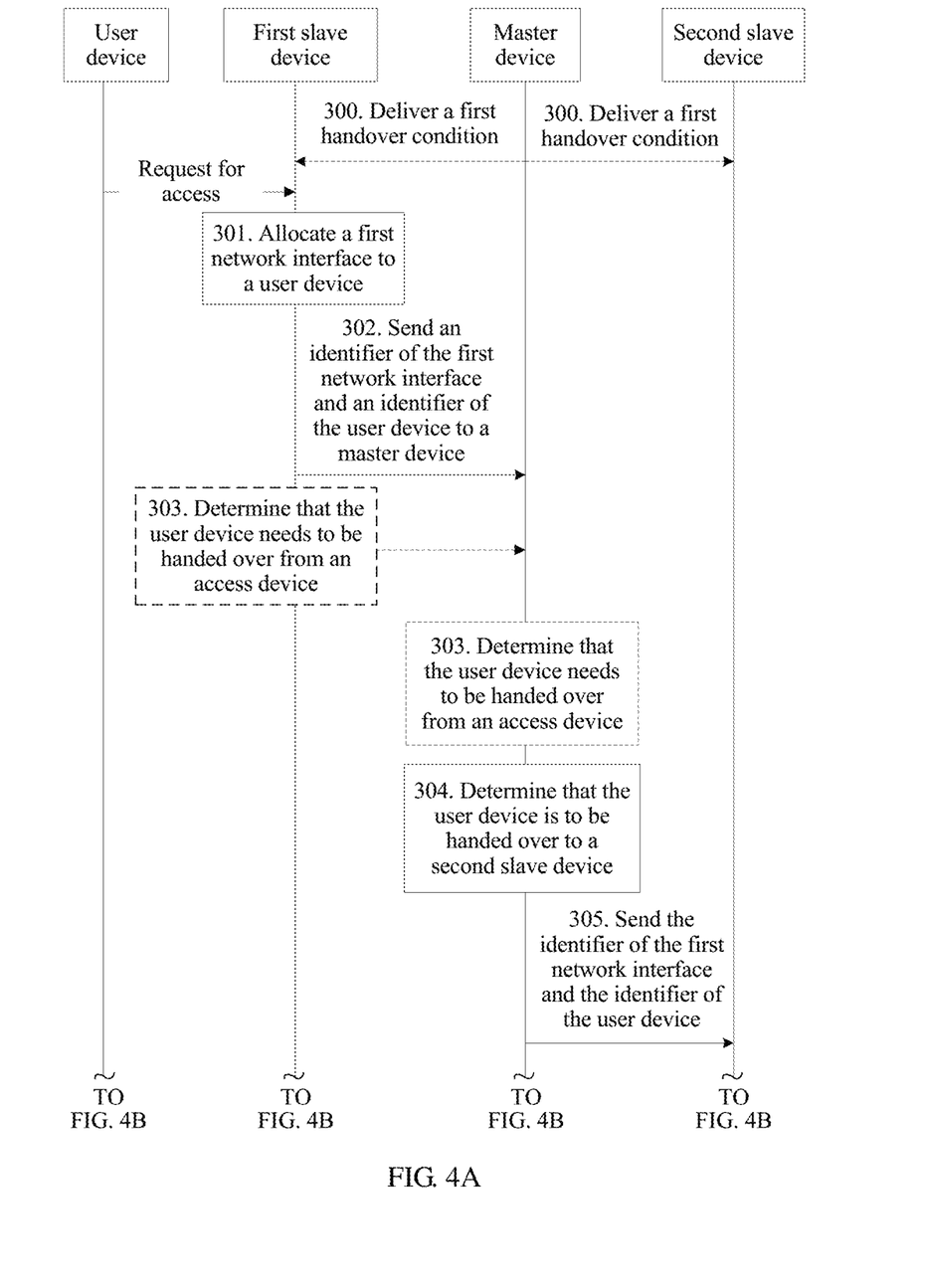
FIG. 4A and FIG. 4B are a flowchart of another handover method in a wireless network according to an embodiment of the present invention.
Figure 4B:
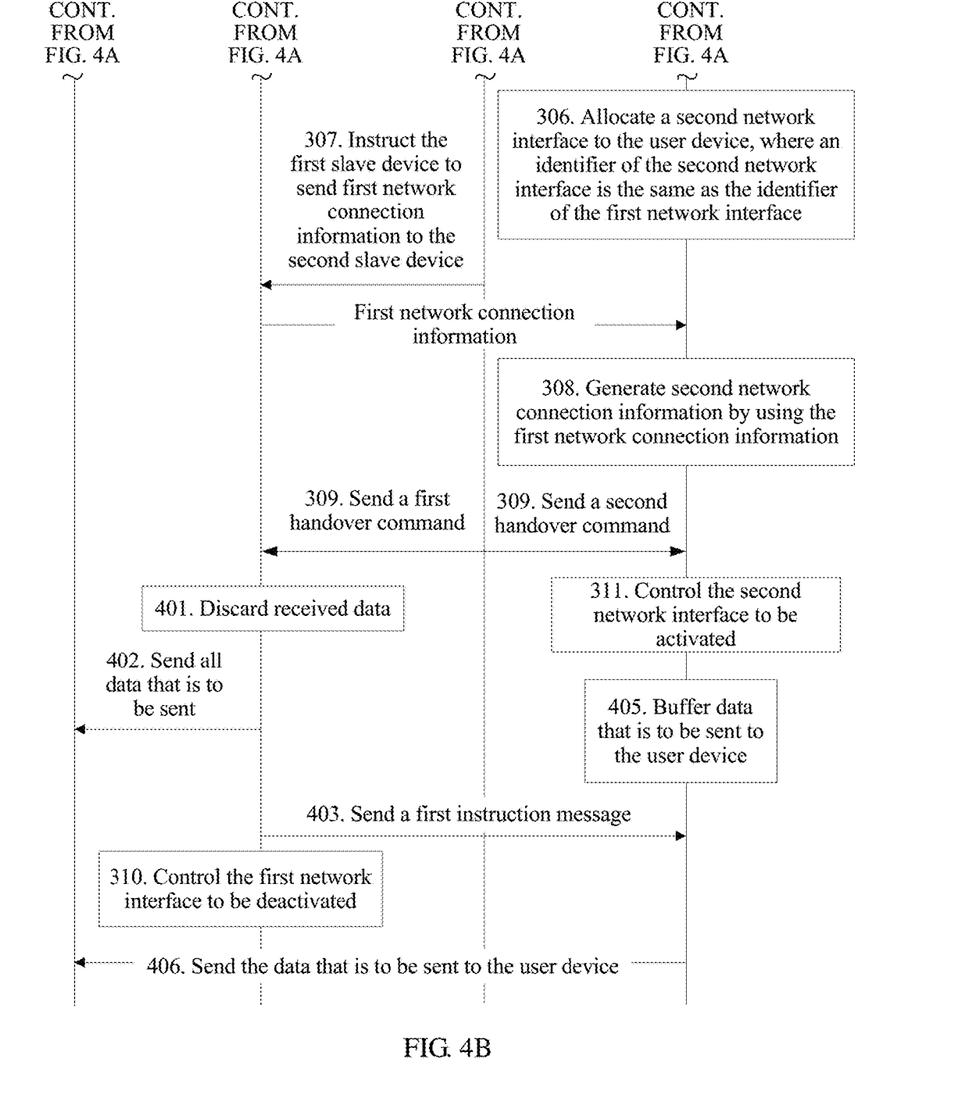

FIG. 4A and FIG. 4B are a flowchart of another handover method in a wireless network according to an embodiment of the present invention. Some modifications are made in FIG. 4A and FIG. 4B on the basis of FIG. 1. Only a modified part is described in detail below, and for a same part, refer to related descriptions in FIG. 1.

After step 309 and before step 310, the first slave device further performs the following steps.

Step 401: The first slave device discards received data related to the user device.

It should be noted that the discarded data is data received after the first handover command is received.

Step 402: The first slave device sends all data that is to be sent to the user device.

Step 403: After the first slave device performs step 402, the first slave device sends a first instruction message, where the first instruction message is used to instruct the second slave device to start sending data to the user device.

After step 311, the second slave device further performs the following steps.

Step 405: The second slave device buffers data that is to be sent to the user device.

It should be noted that the second slave device buffers only the data that is to be sent to the user device. Data to be sent to a network side can be normally sent.

Step 406: The second slave device sends, to the user device after receiving the first instruction message sent by the first slave device, the data that is to be sent to the user device.

It should be noted that to fully avoid a data loss, it may be determined to send, after the second slave device receives the second handover command, the first handover command to the first slave device. Therefore, when the first slave device receives the first handover command, the second slave device has already received the second handover command, and the second slave device can already receive data. Therefore, although the first slave device discards the received data, no data loss is caused, because the data is successfully received by the second slave device at this time. A specific implementation may be that the second handover command is first sent to the second slave device, the second slave device sends a response to the master device after receiving the second handover command, and the master device then sends the first handover command to the first slave device after receiving the response. In this way, all data can be processed, and integrity of the data can be effectively ensured.

It should be noted that the first slave device controls the first network interface to be deactivated and the second slave device controls the second network interface to be activated, and a handover from the access device can be completed, that is, the second slave device is used to provide a network service for the user device. However, a loss of data that has been sent to the first slave device is not considered. Therefore, the first slave device needs to send all the data that is to be sent, discard newly received data, and send the first instruction message to the second slave device after sending all the data that is to be sent, to instruct the second slave device to start sending data to the user device. Finally, the first slave device controls the first network interface to be deactivated. Only one slave device can provide the network service for the user device at a time. Therefore, in this case, although the second network interface of the second slave device is already activated, the data that is to be sent to the user device needs to be buffered first, and after the first instruction message of the first slave device is received, the data starts to be sent to the user device, that is, the network service is normally provided for the user device. Therefore, in this manner, the problem of a long handover time can be resolved, and a problem of a data loss can be effectively resolved.

It should be noted that in this embodiment of the present invention, only one communications network is used as an example to describe the handover method, that is, the communications network includes one master device. For a case with multiple communications networks, this embodiment of the present invention is also applicable. That is, when a slave device that can provide a network service for the user device cannot be found in the communications network managed by the master device, the master device may send the identifier of the user device and the identifier of the first network interface to a nearby master device, and the nearby master device may perform the method in this embodiment of the present invention in a network range managed by the nearby master device.

Figure 5:
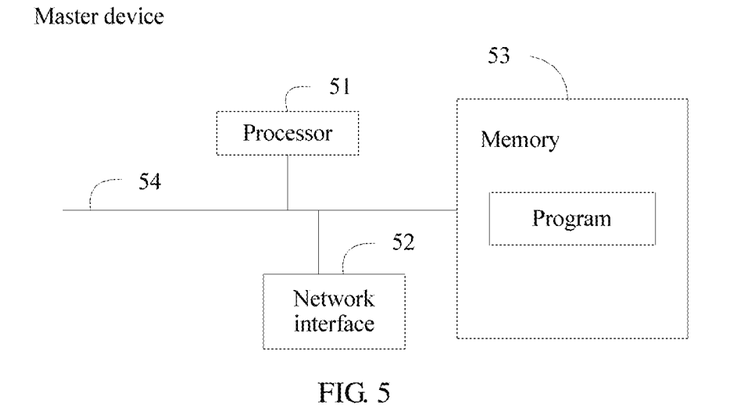
FIG. 5 is a schematic structural diagram of a master device according to an embodiment of the present invention.

An embodiment of the present invention provides a master device 50. Referring to FIG. 5, FIG. 5 is a schematic structural diagram of the master device provided in this embodiment of the present invention, including a processor 51, a network interface 52, a memory 53, and a communications bus 54. The communications bus 54 is configured to implement connection and communication between the processor 51, the network interface 52, and the memory 53, and the processor 61 executes a program that is stored in the memory 53 and that is executed by the foregoing master device.

Figure 6:
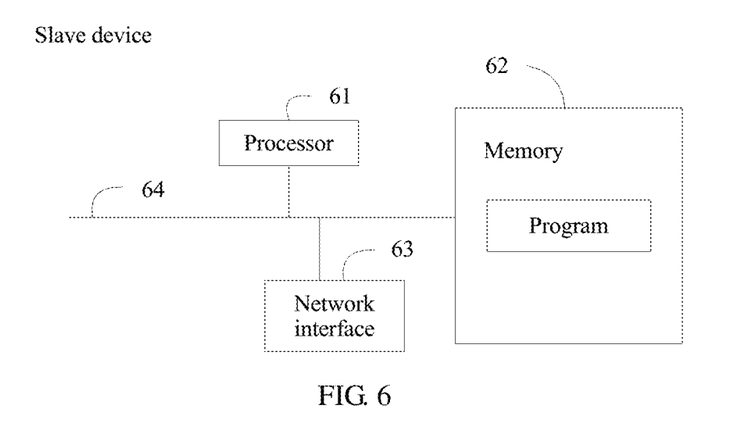
FIG. 6 is a schematic structural diagram of a slave device according to an embodiment of the present invention.

An embodiment of the present invention provides a slave device 60. Referring to FIG. 6, FIG. 6 is a schematic structural diagram of the master device provided in this embodiment of the present invention, including a processor 61, a network interface 62, a memory 63, and a communications bus 64. The communications bus 64 is configured to implement connection and communication between the processor 61, the network interface 62, and the memory 63, and the processor 61 executes a program that is stored in the memory 63 and that is executed by the foregoing first slave device.

An embodiment of the present invention provides a slave device 60. Referring to FIG. 6, FIG. 6 is a schematic structural diagram of the master device provided in this embodiment of the present invention, including a processor 61, a network interface 62, a memory 63, and a communications bus 64. The communications bus 64 is configured to implement connection and communication between the processor 61, the network interface 62, and the memory 63, and the processor 61 executes a program that is stored in the memory 63 and that is executed by the foregoing second slave device.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (Read Only Memory, ROM for short), a random access memory (Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A handover method in a master-slave network, the method comprising:

determining, by a master device of the master-slave network, that a user device needs to be handed over from an access device, wherein the master-slave network comprises the master device, a first slave device, a second slave device, and the user device, and wherein the first slave device is the access device of the user device;

determining, by the master device, that the user device is to be handed over to the second slave device;

sending, by the master device to the second slave device, a first identifier of a first network interface and a second identifier of the user device, wherein the first identifier and the second identifier are received by the master device from the first slave device, wherein the sending the first identifier and the second identifier to the second slave device causes the second slave device to allocate a second network interface to the user device, wherein a third identifier of the second network interface is the same as the first identifier of the first network interface, wherein the first network interface is a network interface allocated by the first slave device to the user device and used when the user device accesses the first slave device, and wherein the second identifier of the user device and the first identifier of the first network interface correspond on a one-to-one basis;

instructing, by the master device, the first slave device to send first network connection information to the second slave device, wherein the first network connection information is information associated with a first connection established between the user device and the first network interface of the first slave device, wherein the first slave device sending the first network connection information to the second slave device causes the second slave device to generate second network connection information using the first network connection information, wherein the second network connection information is network connection information associated with a second connection between the user device and the second network interface of the second slave device;

sending, by the master device, a first handover command to the first slave device, wherein the first handover command enables the first slave device to deactivate the first network interface; and sending a second handover command to the second slave device, wherein the second handover command enables the second slave device to activate the second network interface.

2. The method according to claim 1, wherein the determining that the user device needs to be handed over from the access device comprises performing at least one of:

receiving, by the master device from the first slave device, the second identifier of the user device and first link status information of the user device, and determining, according to the first link status information and a first handover condition, that the user device needs to be handed over from the access device; or receiving, by the master device, a second indication message sent by the first slave device, wherein the second indication message is an indication message sent to the master device in response to the first slave device determining, according to first link status information of the user device and a first handover condition, that the user device needs to be handed over from the access device, wherein the second indication message notifies the master device that the user device needs to be handed over from the access device, and wherein the second indication message carries the second identifier of the user device, and wherein the first handover condition is that at least one value in the first link status information reaches a corresponding preset threshold.

3. The method according to claim 2, wherein the determining that the user device needs to be handed over to the second slave device comprises:

receiving, by the master device from the first slave device, the second identifier of the user device and an operating channel of the user device;

sending, by the master device, the second identifier of the user device and the operating channel of the user device to the second slave device, wherein sending the second identifier and the operating channel to the second slave device causes the second slave device to send second link status information to the master device, wherein the second link status information comprises at least one of a received signal strength indicator (RSSI) associated with the user device and that is on the operating channel obtained by the second slave device, a packet error rate (PER) associated with the user device and that is on the operating channel obtained by the second slave device, a signal-to-noise ratio associated with the user device and that is on the operating channel obtained by the second slave device, a quantity of user devices that access the second slave device, a duty cycle of a user device that accesses the second slave device, or a throughput of a user device that accesses the second slave device; and:

determining, by the master device according to the second link status information and a second handover condition, that the user device needs to handed over to the second slave device, wherein the second handover condition is that at least one value in the second link status information reaches a corresponding preset threshold.

4. The method according to claim 2, wherein the instructing the first slave device to send the first network connection information to the second slave device comprises performing at least one of:

obtaining, by the master device, the first network connection information, and sending the first network connection information to the second slave device; or sending, by the master device, instruction information to the first slave device, wherein the instruction information instructs the first slave device to send the first network connection information to the second slave device.

5. The method according to claim 2, wherein the first network connection information comprises at least one of a service set identifier, an encryption mode, key information, state machine information, address resolution protocol (ARP) information, the second identifier of the user device, or an Internet Protocol (IP) address.

6. The method according to claim 1, wherein the determining that the user device needs to be handed over from the access device comprises determining, according to at least first link status information of the user device, that the user device needs to be handed over from the access device; and wherein the first link status information comprises at least one of a received signal strength indicator (RSSI) associated with the user device, a packet error rate (PER) associated with the user device, a signal-to-noise ratio associated with the user device, a quantity of user devices that access the first slave device, a duty cycle of a user device that accesses the first slave device, or a throughput of a user device that accesses the first slave device.

7. The method according to claim 1, wherein the determining that the user device needs to be handed over to the second slave device comprises:

receiving, by the master device from the first slave device, the second identifier of the user device and an operating channel of the user device;

sending, by the master device, the second identifier of the user device and the operating channel of the user device to the second slave device, the sending the second identifier and the operation channel to the second slave device causing the second slave device to send second link status information to the master device, wherein the second link status information comprises at least one of a received signal strength indicator (RSSI) associated with the user device and that is on the operating channel obtained by the second slave device, a packet error rate (PER) associated with the user device and that is on the operating channel obtained by the second slave device, a signal-to-noise ratio associated with the user device and that is on the operating channel obtained by the second slave device, a quantity of user devices that access the second slave device, a duty cycle of a user device that accesses the second slave device, or a throughput of a user device that accesses the second slave device; and determining, by the master device according to the second link status information and a second handover condition, that the user device is to be handed over to the second slave device, wherein the second handover condition is that at least one value in the second link status information reaches a corresponding preset threshold.

8. The method according to claim 1, wherein the instructing, by the master device, the first slave device to send first network connection information to the second slave device comprises:

obtaining, by the master device, the first network connection information, and sending the first network connection information to the second slave device; or sending, by the master device, instruction information to the first slave device, wherein the instruction information instructs the first slave device to send the first network connection information to the second slave device.

9. The method according to claim 1, wherein the first network connection information comprises at least one of a service set identifier, an encryption mode, key information, state machine information, address resolution protocol (ARP) information, the second identifier of the user device, or an Internet Protocol (IP) address.

10. A handover method in a master-slave network, the method comprising:

determining, by a first slave device in the master-slave network, that a user device of the master-slave network needs to be handed over from an access device, wherein the master-slave network comprises a master device, the first slave device, a second slave device, and the user device, the first slave device is the access device of the user device;

sending, by the first slave device, a second identifier of the user device to the master device, the sending the second identifier of the user device to the master device causing the master device to determine that the user device needs to be handed over to the second slave device, and sending a first identifier of a first network interface and the second identifier of the user device to the second slave device, the sending the first identifier the second identifier of the user device to the second slave device causing the second slave device to allocate a second network interface to the user device, wherein a third identifier of the second network interface is the same as the first identifier of the first network interface, wherein the first network interface is a network interface allocated by the first slave device to the user device and used when the user device accesses the first slave device, and wherein the second identifier of the user device and the first identifier of the first network interface correspond on a one-to-one basis;

sending, by the first slave device, first network connection information to the second slave device according to an instruction of the master device, wherein the first network connection information is information associated with a first connection established between the user device and the first network interface of the first slave device, the sending the first network connection information to the second slave device causing the second slave device to generate second network connection information using the first network connection information, wherein the second network connection information is network connection information associated with a second connection between the user device and the second network interface of the second slave device;

receiving, by the first slave device, a first handover command sent by the master device, wherein the first handover command is a handover command sent simultaneously with, or after, the master device sends a second handover command to the second slave device, and wherein the second handover command causes the second slave device to activate the second network interface; and deactivating, by the first slave device, the first network interface in response to receiving the first handover command.

11. The method according to claim 10, wherein the method further comprises performing, after the first handover command is received and before the first slave device deactivates the first network interface:

discarding, by the first slave device, received data associated with the user device; and:

sending, by the first slave device, a first instruction message after the first slave device sends all data that is to be sent to the user device, wherein the first instruction message instructs the second slave device to send data to the user device.

12. The method according to claim 11, wherein the determining that the user device needs to be handed over from the access device comprises:

determining, by the first slave device according to first link status information of the user device and a first handover condition, that the user device needs to be handed over from the access device; and sending a second indication message to the master device, wherein the second indication message notifies the master device that the user device needs to be handed over from the access device, wherein the second indication message carries the second identifier of the user device, and wherein the first handover condition is that at least one value in the first link status information reaches a corresponding preset threshold.

13. The method according to claim 11, wherein the determining that the user device needs to be handed over from the access device comprises determining, according to at least first link status information of the user device, that the user device needs to be handed over from the access device; and wherein the first link status information comprises at least one of a received signal strength indicator (RSSI) associated with the user device, a packet error rate (PER) associated with the user device, a signal-to-noise ratio associated with the user device, a quantity of user devices that access the first slave device, a duty cycle of a user device that accesses the first slave device, or a throughput of a user device that accesses the first slave device.

14. The method according to claim 11, wherein the sending the first network connection information to the second slave device comprises receiving, by the first slave device, a third instruction message of the master device, wherein the third instruction message instructs the first slave device to send the first network connection information to the second slave device.

15. The method according to claim 10, wherein the determining that the user device needs to be handed over from the access device comprises:

determining, by the first slave device according to first link status information of the user device and a first handover condition, that the user device needs to be handed over from the access device; and sending a second indication message to the master device, wherein the second indication message notifies the master device that the user device needs to be handed over from the access device, wherein the second indication message carries the second identifier of the user device, and wherein the first handover condition is that at least one value in the first link status information reaches a corresponding preset threshold.

16. The method according to claim 10, wherein the determining that the user device needs to be handed over from the access device comprises determining, according to at least first link status information of the user device, that the user device needs to be handed over from the access device; and wherein the first link status information comprises at least one of a received signal strength indicator (RSSI) associated with the user device, a packet error rate (PER) associated with the user device, a signal-to-noise ratio associated with the user device, a quantity of user devices that access the first slave device, a duty cycle of a user device that accesses the first slave device, or a throughput of a user device that accesses the first slave device.

17. The method according to claim 10, wherein the sending the first network connection information to the second slave device comprises receiving, by the first slave device, a third instruction message of the master device, wherein the third instruction message instructs the first slave device to send the first network connection information to the second slave device.

18. The method according to claim 10, wherein the first network connection information comprises at least one of a service set identifier, an encryption mode, key information, state machine information, address resolution protocol ARP information, or an Internet Protocol IP address.

19. A handover method in a master-slave network, the method comprising:
receiving, by a second slave device of the master-slave network, a first identifier of a first network interface of a first slave device of the master-slave network and a second identifier of a user device of the master-slave network that are sent by a master device of the master-slave network, wherein the first slave device is a current access device of the user device, wherein the first network interface is a network interface allocated by the first slave device to the user device and used when the user device accesses the first slave device, and the second identifier of the user device and the first identifier of the first network interface correspond on a one-to-one basis;
allocating, by the second slave device, a second network interface to the user device, wherein a third identifier of the second network interface is the same as the first identifier of the first network interface;
receiving, by the second slave device, first network connection information of the first slave device, wherein the first network connection information is network connection information associated with a first connection established between the user device and the first network interface of the first slave device:
generating, by the second slave device, second network connection information by using the first network connection information, wherein the second network connection information is network connection information associated with a second connection between the user device and the second network interface of the second slave device;
receiving a second handover command sent by the master device; and:
activating the second network interface to be activated by the second slave device in response to receiving the second handover command.

20. The method according to claim 19, wherein the method further comprises performing, after the activating the second network interface by the second slave device:
buffering, by the second slave device, data that is to be sent to the user device; and:
sending, by the second slave device to the user device after receiving a first instruction message, the data that is to be sent to the user device, wherein the first instruction message is an instruction message sent to the first slave device after the first slave device sends all data that is to be sent to the user device, and the first instruction message is used to instruct the second slave device to send data to the user device.

* * * * *